(12) United States Patent
Shih (10) Patent No.: US 9,927,585 B1
(45) Date of Patent: Mar. 27, 2018

(54) HOUSING STRUCTURE FOR OPTICAL TRANSCEIVER MODULE

(71) Applicant: Chen-Yueh Shih, New Taipei (TW)

(72) Inventor: Chen-Yueh Shih, New Taipei (TW)

( * ) Notice: Subject to any disclaimer, the term of this patent is extended or adjusted under 35 U.S.C. 154(b) by 0 days.

(21) Appl. No.: 15/682,364

(22) Filed: Aug. 21, 2017

(30) Foreign Application Priority Data

Sep. 23, 2016 (TW) .............................. 105214610 U (51) Int. Cl.
  *G02B 6/36* (2006.01)
  *G02B 6/42* (2006.01)

(52) U.S. Cl.
  CPC ......... *G02B 6/4257* (2013.01); *G02B 6/4261* (2013.01); *G02B 6/4262* (2013.01); *G02B 6/4277* (2013.01)

(58) Field of Classification Search
  CPC .. G02B 6/4257; G02B 6/4261; G02B 6/4262; G02B 6/4277
  USPC .......................................................... 385/92
  See application file for complete search history.

(56) References Cited

U.S. PATENT DOCUMENTS

| | | | | |
|---|---|---|---|---|
| 6,151,432 A | * | 11/2000 | Nakajima ............ | G02B 6/3831 385/55 |
| 7,116,912 B2 | * | 10/2006 | Pang .................... | G02B 6/4201 385/92 |
| 7,121,736 B2 | * | 10/2006 | Ayame ................. | G02B 6/4298 385/53 |
| 8,506,172 B2 | * | 8/2013 | Meadowcroft ...... | G02B 6/4261 385/147 |

\* cited by examiner

*Primary Examiner* — Jerry Blevins
(74) *Attorney, Agent, or Firm* — Chun-Ming Shih; HDLS IPR Services (57) ABSTRACT

A housing structure for an optical transceiver module includes a casing and a pull member. The casing includes a side wall, two fixation blocks protruding from the side wall at two sides, a connection slot formed on the side wall, and a positioning block disposed in the connection slot. The pull member is movably coupled to the casing. The pull member includes a connection plate arranged corresponding to the connection slot and includes a positioning portion arranged corresponding to the positioning block. An engagement portion for engagement with the connection plate is placed on an inner surface of each of the fixation blocks. Accordingly, the pull member of the housing structure can be rapidly assembled to the casing without use of additional components.

11 Claims, 8 Drawing Sheets

HOUSING STRUCTURE FOR OPTICAL TRANSCEIVER MODULE

TECHNICAL FIELD

The present invention relates to an optical transceiver module and, in particular, to a housing structure for an optical transceiver module, which allows a pull member to be rapidly assembled to a casing.

BACKGROUND

Due to a growing demand and need for the Internet, optical communication technology has been well developed and extensively used. As a result, increased communication speed and quality are also demanded. An optical transceiver is a key component to achieve high speed data communications with reduced distortion. The optical transceiver can be an optical transmitter and an optical receiver, or can be an optical transceiver module incorporating the both together. The optical transmitter is configured to convert electrical signals into optical signals for transmission while the optical receiver is configured to convert the received optical signals into electrical signals.

Conventional optical transceiver modules can be stacked and installed in a power distribution box of an apartment, an office or in each floor of a building, for connecting and receiving optical cables. When any optical transceiver module malfunctions, an operator only needs to pull out, from a panel in the power distribution box, this optical transceiver module for repairing or replacing it. The optical transceiver module includes housing members primarily made of metal, and the housing members are fixed to each other with screws. However, to repair the optical transceiver module, the screws have to be unfastened first. Therefore, it is time consuming and inconvenient to repair the optical transceiver module. In addition to that, the metal housing is also costly.

Accordingly, it is the aim of the present invention to improve the above-mentioned problems related to the conventional optical transceiver module, so as to reduce production costs, maintenance time and labor, which is in the best interest of the optical communications field.

SUMMARY

It is an objective of the present invention to provide a housing structure for an optical transceiver module, which allows a pull member to be rapidly assembled to a casing without the use of additional components.

Accordingly, the present invention provides a housing structure for an optical transceiver module. The housing structure includes a casing and a pull member. The casing includes a side wall, two fixation blocks protruding from the side wall and arranged at two sides thereof, a connection slot formed on the side wall, and a positioning block disposed in the connection slot. The pull member is movably coupled to the casing. The pull member includes a connection plate disposed corresponding to the connection slot and includes a positioning portion disposed corresponding to the positioning block, wherein an engagement portion for engagement with the connection plate is disposed on an inner surface of each fixation block.

The present invention further has the following functions. The connection plate includes, at its lateral edge, two first chamfers corresponding to the two engagement portions respectively. An operator can easily and quickly engage the pull member with the casing by applying a force, and the connection plate is limited by the two engagement portions, thus preventing the connection plate from being vertically detached from the casing.

The side wall further includes two extending blocks connected to the two fixation blocks respectively, and a positioning strip is formed on an inner face of each of the extending blocks. The contact portion includes two second chamfers corresponding to the two positioning strips respectively, and thereby the contact portion is also limited by the positioning strips and is prevented from being detached vertically from the casing. Consequently, the pull member is limited by the connection slot of the casing, and thereby the pull member can move axially with stability and reliability with respect to the casing.

Moreover, the pull member is made of a plastic material, thus facilitating easy production of the housing structure, reducing electromagnetic interference, reducing the entire weight of the housing structure, and lowering production costs.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
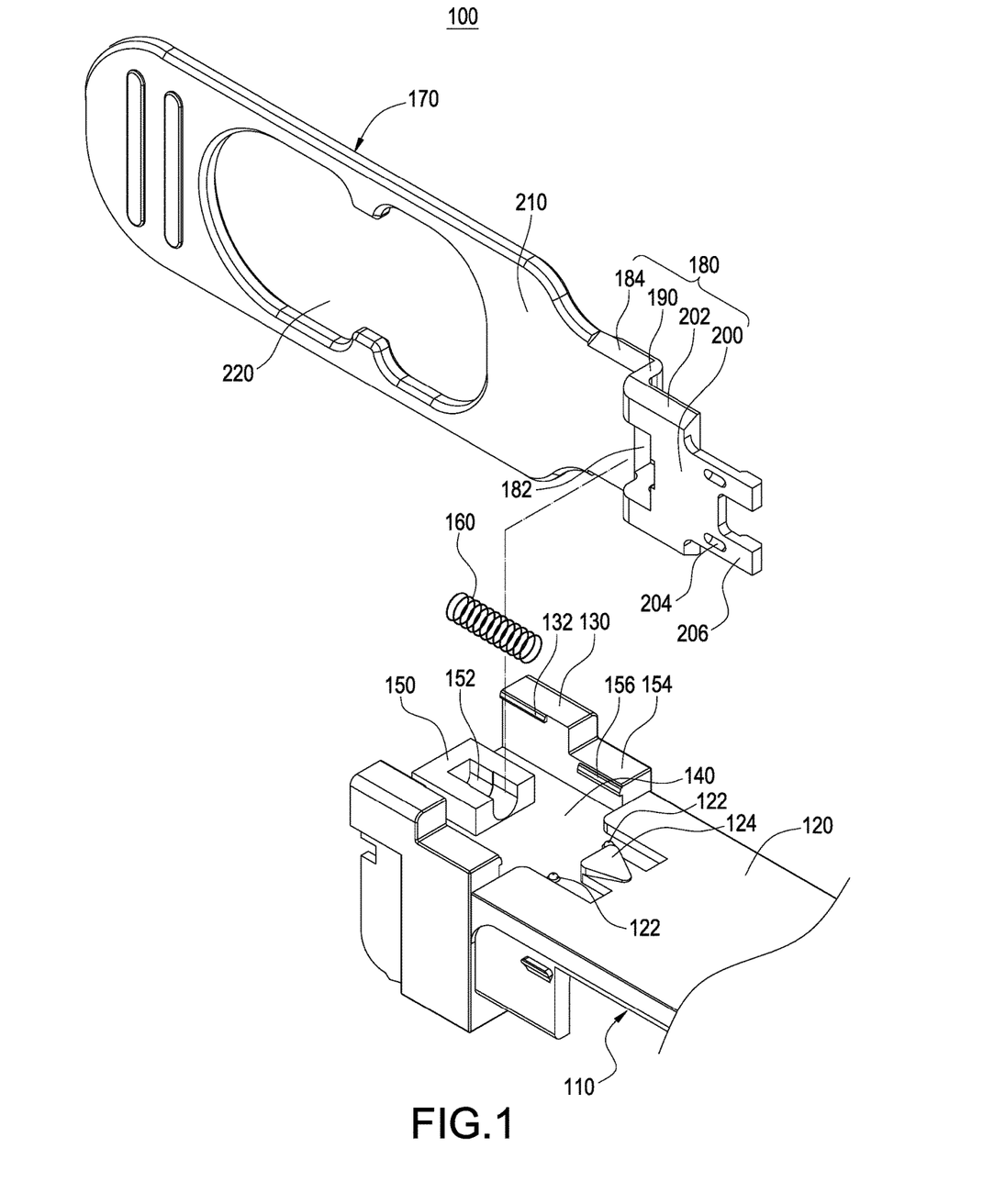
FIG. 1 is a partial exploded view illustrating a housing structure for an optical transceiver module according to the present invention.
Figure 2:
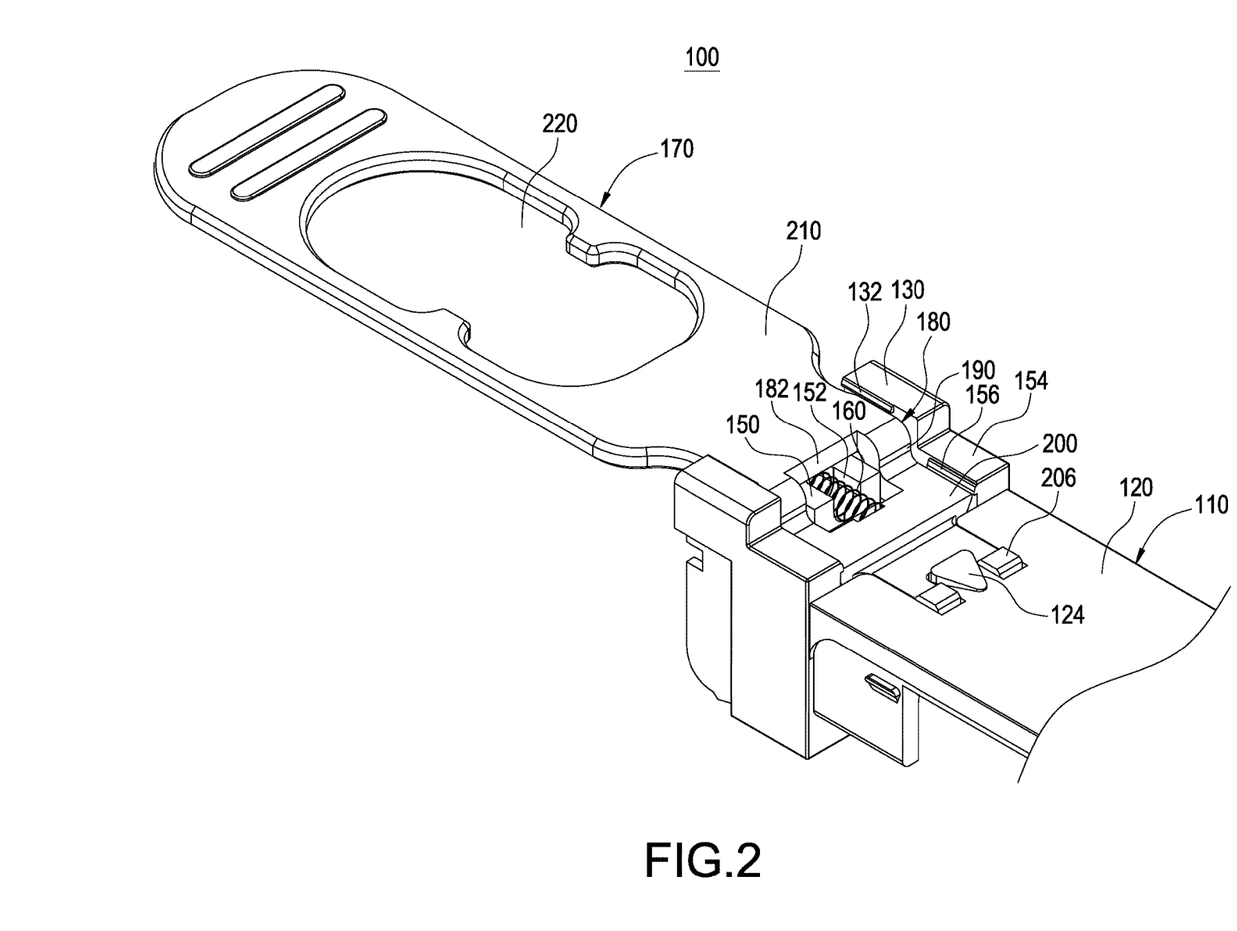
FIG. 2 is a partial assembled view illustrating the housing structure for the optical transceiver module according to the present invention.
Figure 3:
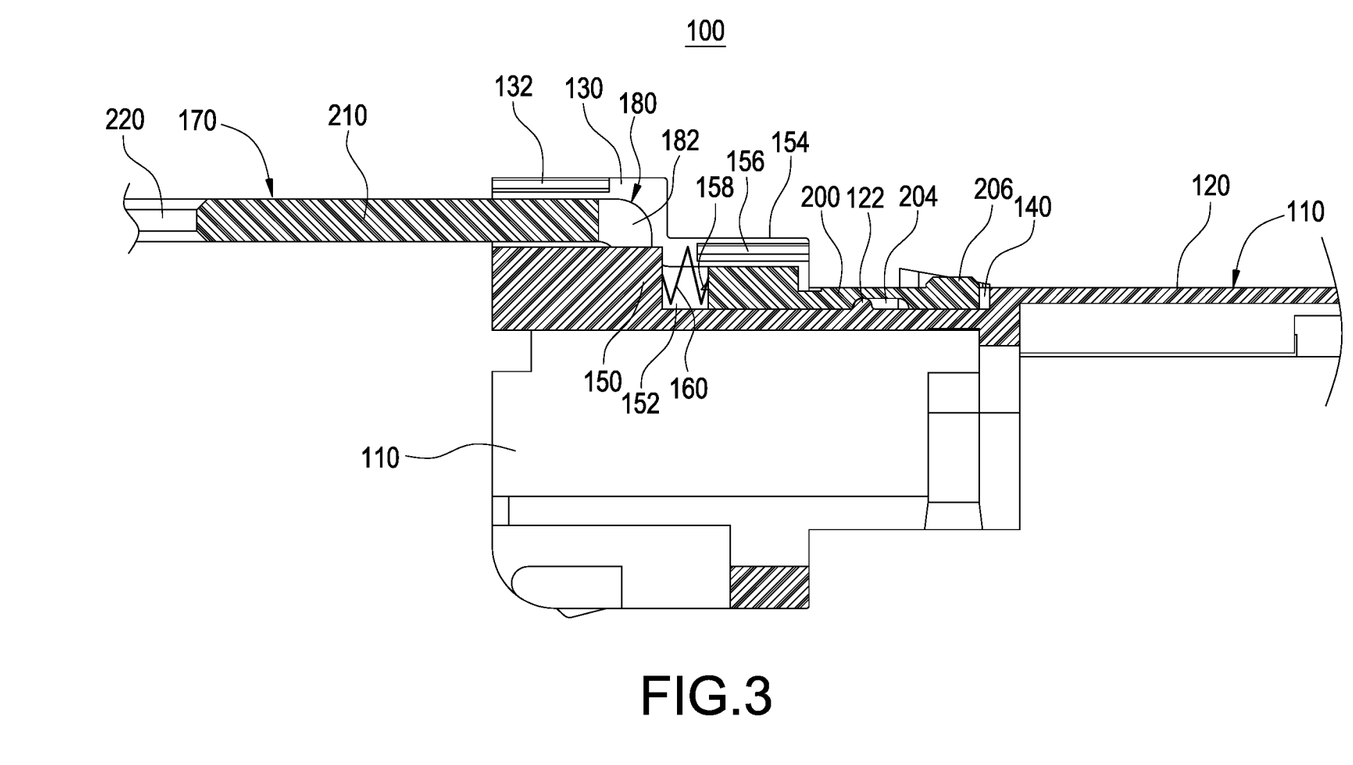
FIG. 3 is a partial cross-sectional view illustrating the housing structure for the optical transceiver module according to the present invention.

Referring to FIGS. 1 to 3, the present invention provides a housing structure 100 for an optical transceiver module. The housing structure 100 includes a casing 110 and a pull member 170. The pull member 170 is preferably made of a plastic material. In detail, the plastic material is selected from a group consisting of polyetherimide (PEI), acrylonitrile butadiene styrene (ABS), polyoxymethylene (POM), polyamide (PA), polycarbonate (PC), polyethylene (PE), and a combination thereof.

Figure 4:
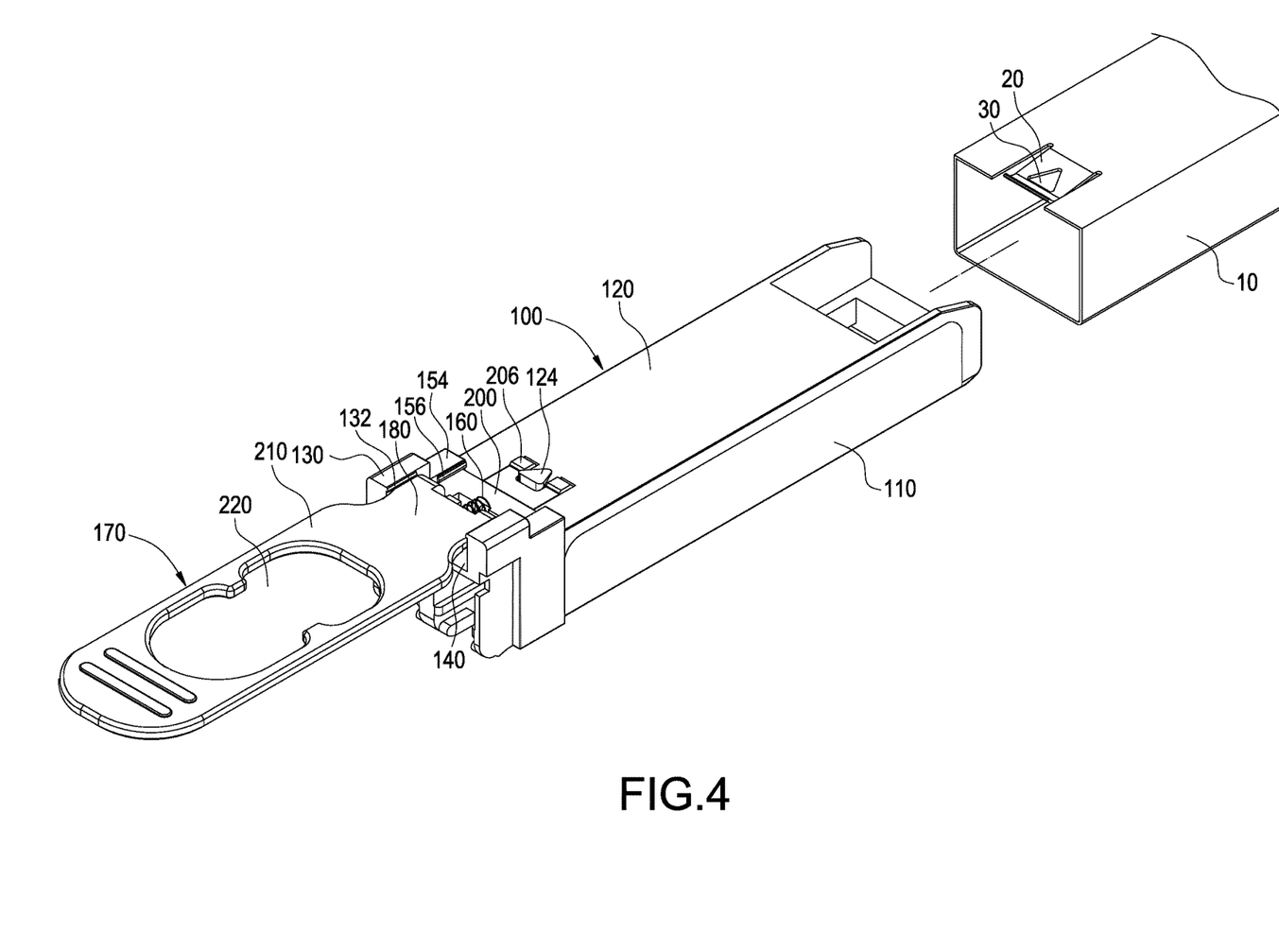
FIG. 4 is a perspective exploded view illustrating that the housing structure of the present invention is detached from or assembled to a socket.

The pull member 170 is made of a plastic material, thus reducing the entire weight of the housing structure 100, lowering production costs, facilitating easy production of the housing structure 100, and also reducing electromagnetic interference. The casing 110 consists of metal or other suitable material. Referring to FIG. 4, after the pull member 170 is assembled to the casing 110, the casing 110 is coupled to a socket 10 to achieve transmission of electronic signals and optical signals and conversion therebetween.

The casing 110 includes a side wall 120, two fixation blocks 130 protruding from the side wall 120 and arranged at two sides thereof respectively, a connection slot 140 formed on the side wall 120, and a positioning block 150 disposed in the connection slot 140. In other words, the connection slot 140 is formed on a front edge of the casing 110. The two fixation blocks 130 arranged correspondingly and the positioning block 150 are disposed in the connection slot 140. The positioning block 150 is disposed between the two positioning blocks 130.

The pull member 170 is movably coupled to the casing 110. The pull member 170 includes a connection plate 180 disposed corresponding to the connection slot 140 and includes a positioning portion 182 disposed corresponding to the positioning block 150, wherein an engagement portion 132 for engagement with the connection plate 180 is disposed on an inner surface of each of the fixation blocks 130. In the embodiment shown in FIG. 1, the engagement portion 132 is preferably a protruding strip. However, in other embodiment, the engagement portion 132 can also be a protruding block or other suitable member, and the present invention is not limited in this regard.

The connection plate 180 includes a bent portion 190, a contact portion 200 connected to one end of the bent portion 190, and an extension bar 210 connected to the other end of the bent portion 190. In this embodiment, the positioning portion 182 is a through hole, and the through hole is formed on the bent portion 190 and a portion of the contact portion 200. However, in other embodiment, the positioning portion 182 can be a recess or other suitable structure. The connection plate 180 includes, at its edge, two first chamfers 184 corresponding to the two engagement portions 132 respectively, so that a user can easily engage the pull member 170 with the casing 110 by applying a force. The connection plate 180 is limited by the two engagement portions 132, and thereby is prevented from being vertically detached from the casing 110.

Preferably, the side wall 120 further includes two extending blocks 154 connected to the two fixation blocks 130 respectively, a positioning strip 156 is formed on an inner face of each of the extending blocks 154, and the contact portion 200 includes two second chamfers 202 corresponding to the two positioning strips 156 respectively, so that the contact portion 200 is limited by each positioning strip 156 and is thereby prevented from being detached from the casing 10 in a vertical direction. As a result, the pull member 170 is limited by the connection slot 140 of the casing 110, thus ensuring the pull member 170 to move axially with stability and reliability with respect to the casing 110.

Referring to FIGS. 1 to 3, the contact portion 200 is slidable with respect to a bottom of the connection slot 140. The extension bar 210 is movable with respect to a top of the positioning block 150. Top surfaces of the extension bar 210 and the contact portion 200 are limited by the engagement portion 132 and the positioning strip 156. Therefore, the pull member 170 is movable along the connection slot 140 in the axial direction. As shown in the drawing, each extending block 154 is lower than each fixation block 130. This configuration is to match a shape of the connection plate 180 and to engage the connection plate 180 between the extending block 154 and the fixation block 130.

Vertical movement of the pull member 170 is limited by the connection slot 140 and the positioning block 150 to prevent detachment of the pull member 170 from the casing 110. By pushing the pull member 170 or by applying similar methods, the pull member 170 can be assembled to the casing 110. No additional components, like screws, are required during replacement or maintenance processes, which significantly reduces labor time and production/maintenance costs for industries.

When pressing the pull member 170 to assemble it to the connection slot 140 of the casing 110, a resilient element 160 is also assembled in the positioning block 150 in order to enable the pull member 170 to be restored to its original position. The positioning block 150 also includes a containing groove 152, one end of the resilient element 160 is in contact with an inner surface of the containing groove 152, and the other end of the resilient element 160 is in contact with an inner surface of the positioning portion 182. As shown in FIG. 3, the connection plate 180 includes a limitation portion 158, and the limitation portion 158 preferably protrudes from the inner surface of the positioning portion 182 to position the resilient element 160. In FIG. 2, the other end of the resilient element 160 is limited between the containing groove 152 and the extension bar 210 to position the resilient element 160.

Figure 5:
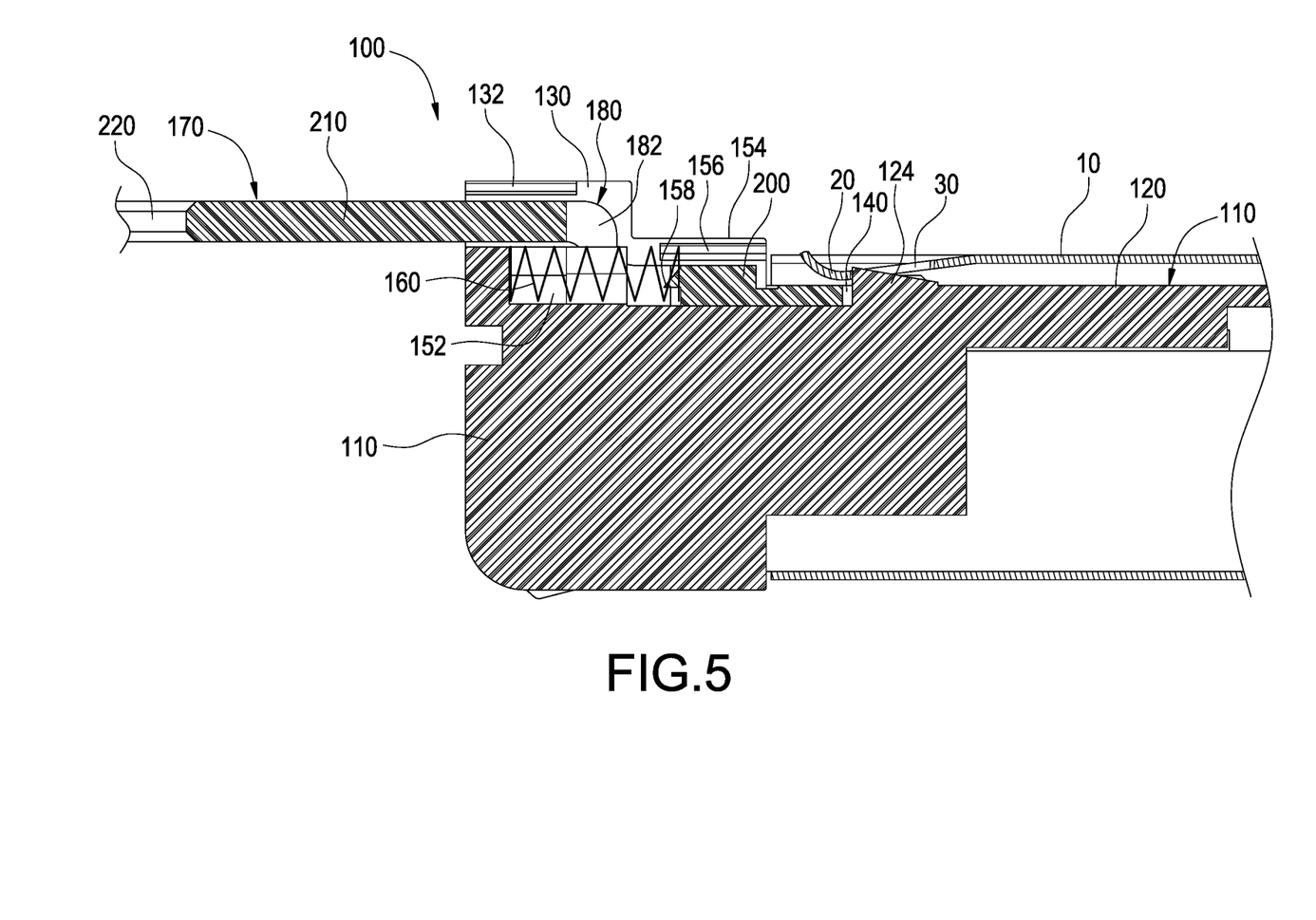
FIG. 5 is a cross-sectional view illustrating that the housing structure of the present invention is assembled to the socket.
Figure 6:
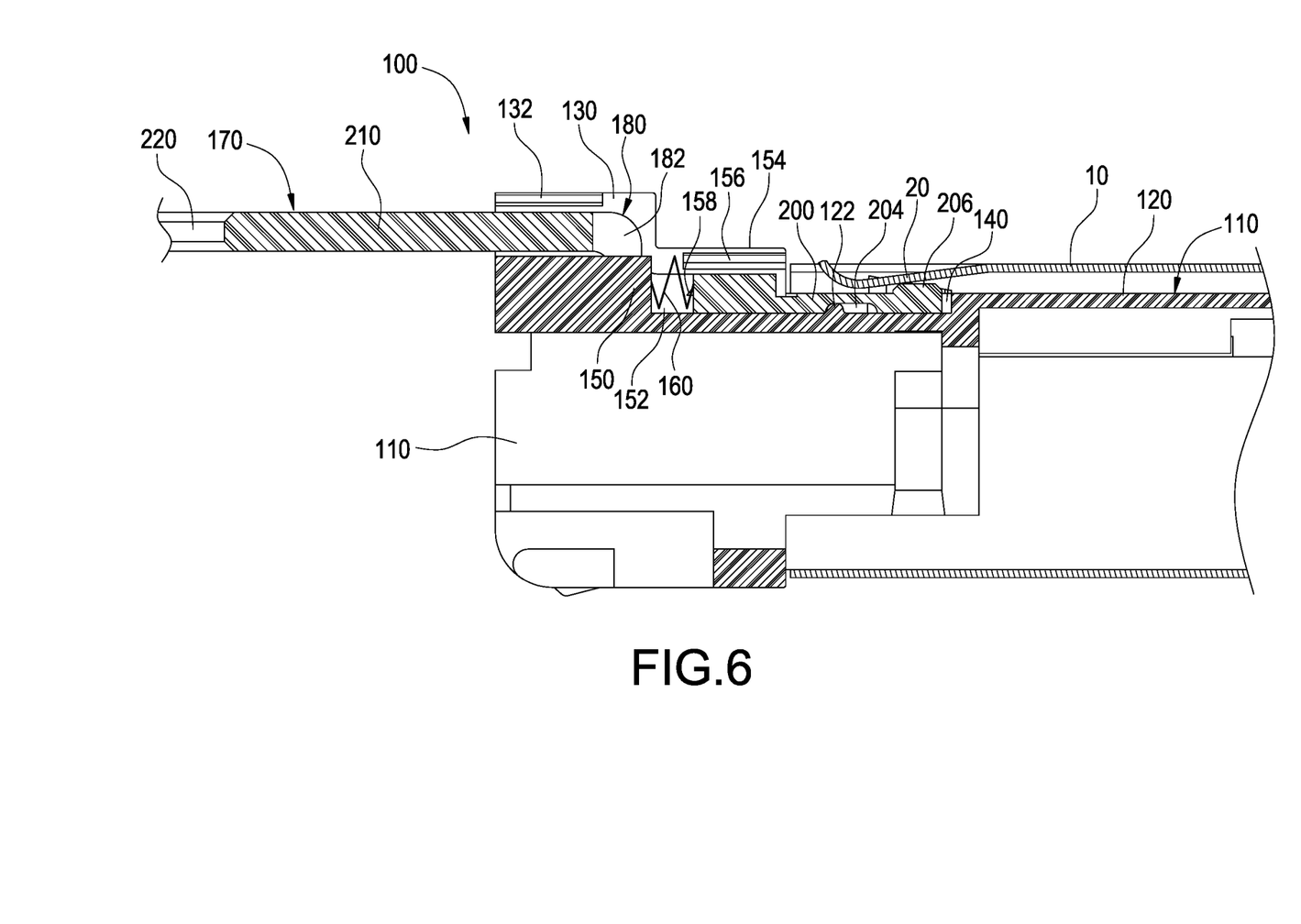
FIG. 6 is another cross-sectional view illustrating the housing structure of the present invention is assembled to the socket.

As shown in FIG. 4, the housing structure 100 is detachably coupled to the socket 10. A resilient plate 20 is disposed at one side of the socket 10. An opening 30 is formed on the resilient plate 20. The side wall 120 of the casing 110 further includes an engagement block 124 arranged corresponding to the resilient plate 20, so that the housing structure 100 can be positioned in the opening 30 of the socket 10. As shown in FIGS. 5 and 6, when the housing structure 100 is inserted and connected to the socket 10, the engagement block 124 is engaged with the opening 30 of the resilient plate 20, so the housing structure 100 is positioned in and electrically coupled to the socket 10. Due to elasticity of the resilient element 160, the pull member 170 stays engaged with the casing 110.

Figure 7:
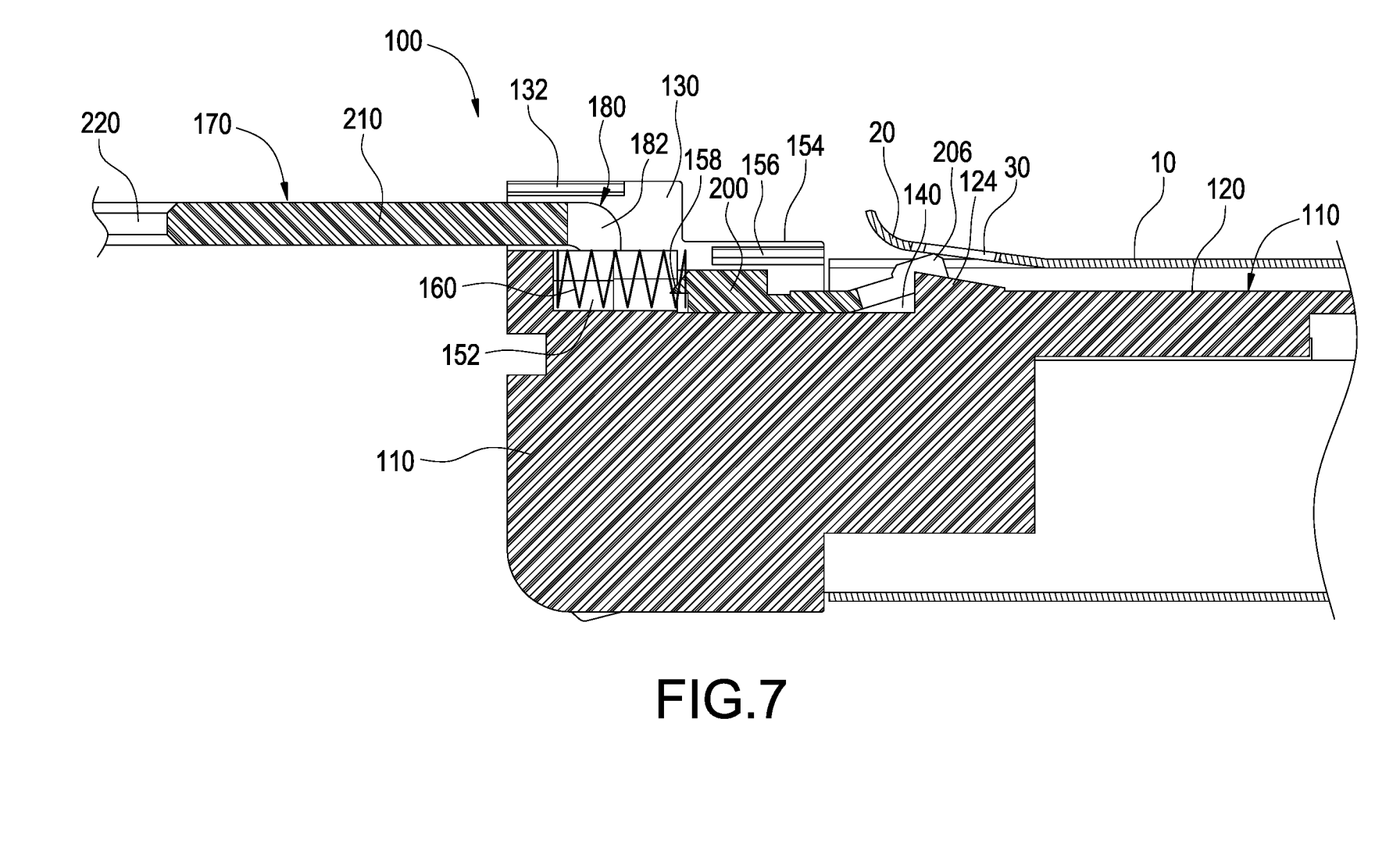
FIG. 7 is a cross-sectional view illustrating the housing structure of the present invention is to be detached from the socket.
Figure 8:
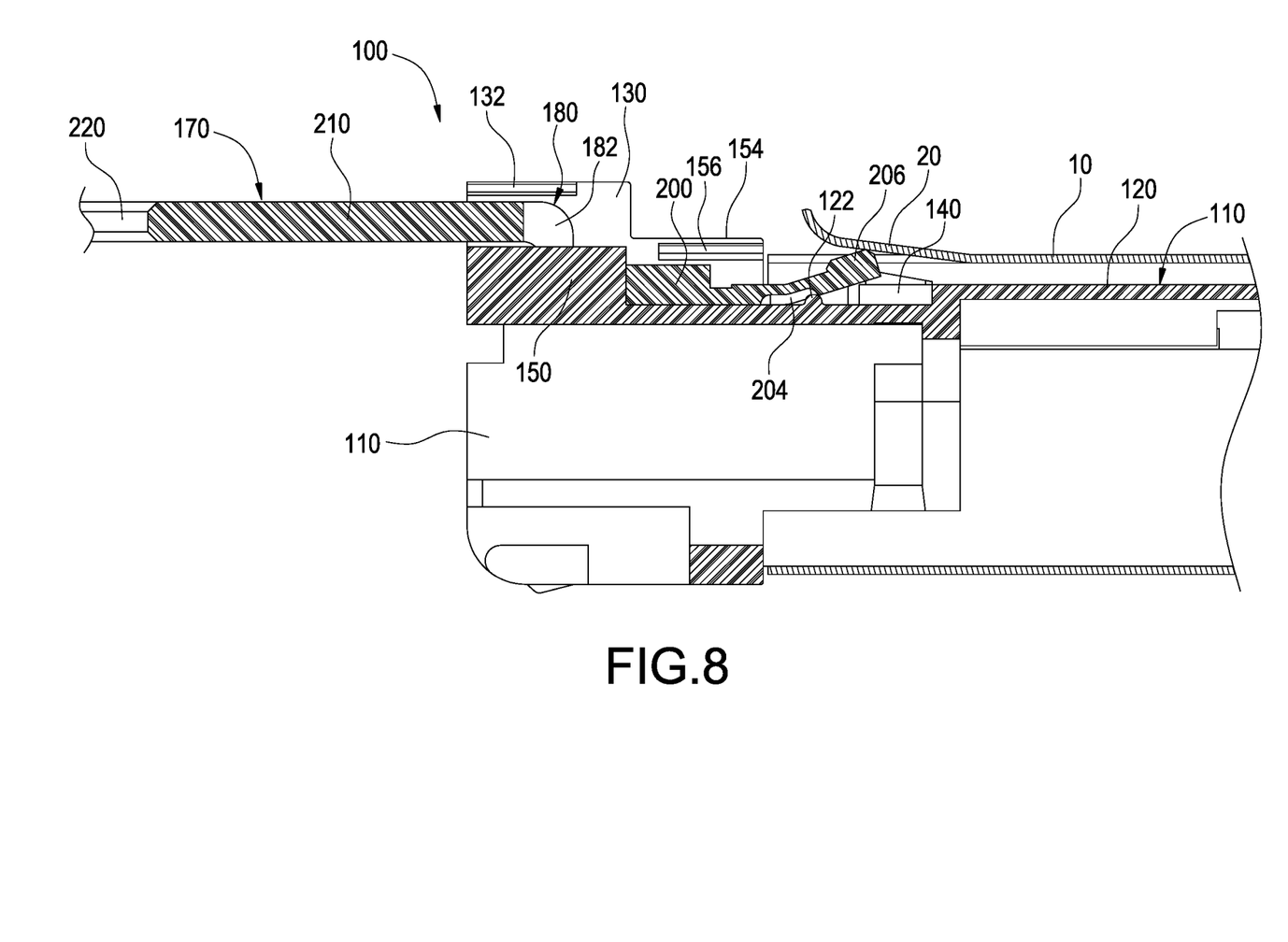
FIG. 8 is another cross-sectional view illustrating the housing structure of the present invention is to be detached from the socket.

Described hereinafter are details regarding to how to detach the housing structure 100 from the socket 10. As shown in FIGS. 7 and 8, when to replace or repair the optical transceiver module, an operator pulls the extension bar 210 of the pull member 170 away from the socket 10, so the pull member 170 slides with respect to the casing 110 until the pull member 170 is detached from the socket 10. The extension bar 210 further includes a pull hole 220 to facilitate the pulling of the extension bar 210.

The side wall 120 of the casing 110 further includes two protruding points 122 adjacent to the engagement block 124 at two sides thereof. As shown in FIG. 1, the connection plate 180 includes two extending plates 206 and includes two slide grooves 204 disposed on respective inner surfaces of the two extending plates 206 corresponding to the two protruding points 122 respectively. In other words, when the positioning portion 182 of the pull member 170 moves axially and approaches the positioning block 150, the two protruding points 122 move in the two slide grooves 204 to guide movement of the two extending plates 206. When the pull member 170 is further pulled in the axial direction, the two protruding points 122 move out of the two slide grooves 204 and then vertically push the two extending plates 206 to move upwards, so that the resilient plate 20 arranged corresponding to the two extending plates 206 is also tilted upwards, and thereby the engagement block 124 of the casing 110 is released from the opening 30 to detach the housing structure 100 from the socket 10.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A housing structure for an optical transceiver module, comprising:
    a casing including a side wall, two fixation blocks protruding from the side wall and arranged at two sides thereof respectively, a connection slot formed on the side wall, and a positioning block disposed in the connection slot; and
    a pull member, the pull member being movably coupled to the casing, the pull member including a connection plate disposed corresponding to the connection slot and including a positioning portion disposed corresponding to the positioning block, wherein an engagement portion for engagement with the connection plate is disposed on an inner surface of each of the fixation blocks,
    wherein the connection plate includes a bent portion, a contact portion connected to one end of the bent portion, and an extension bar connected to the other end of the bent portion.

2. The housing structure for the optical transceiver module according to claim 1, wherein the positioning portion is a through hole, the through hole is formed on the bent portion and a portion of the contact portion, and the connection plate includes two first chamfers corresponding to the two engagement portions respectively.

3. The housing structure for the optical transceiver module according to claim 1, wherein the side wall further includes two extending blocks connected to the two fixation blocks respectively, a positioning strip is formed on an inner face of each of the extending blocks, and the contact portion includes two second chamfers corresponding to the two positioning strips respectively.

4. The housing structure for the optical transceiver module according to claim 1, wherein the side wall further includes two protruding points, and the contact portion includes two slide grooves corresponding to the two protruding points respectively.

5. The housing structure for the optical transceiver module according to claim 3, wherein each of the extending blocks is lower than each of the fixation blocks.

6. The housing structure for the optical transceiver module according to claim 1, further comprising a resilient element disposed in the positioning block.

7. The housing structure for the optical transceiver module according to claim 1, wherein the engagement portion is a protruding strip.

8. The housing structure for the optical transceiver module according to claim 1, wherein the pull member consists of a plastic material.

9. A housing structure for an optical transceiver module, comprising:
    a casing including a side wall, two fixation blocks protruding from the side wall and arranged at two sides thereof respectively, a connection slot formed on the side wall, and a positioning block disposed in the connection slot;
    a pull member, the pull member being movably coupled to the casing, the pull member including a connection plate disposed corresponding to the connection slot and including a positioning portion disposed corresponding to the positioning block, wherein an engagement portion for engagement with the connection plate is disposed on an inner surface of each of the fixation blocks; and
    a resilient element disposed in the positioning block, wherein the positioning block further includes a containing groove, one end of the resilient element is in contact with an inner surface of the containing groove, and the other end of the resilient element is in contact with an inner surface of the positioning portion.

10. The housing structure for the optical transceiver module according to claim 9, wherein the connection plate includes a limitation portion, and the limitation portion protrudes from the inner surface of the positioning portion.

11. A housing structure for an optical transceiver module, comprising:
    a casing including a side wall, two fixation blocks protruding from the side wall and arranged at two sides thereof respectively, a connection slot formed on the side wall, and a positioning block disposed in the connection slot; and
    a pull member, the pull member being movably coupled to the casing, the pull member including a connection plate disposed corresponding to the connection slot and including a positioning portion disposed corresponding to the positioning block, wherein an engagement portion for engagement with the connection plate is disposed on an inner surface of each of the fixation blocks, wherein the connection plate includes two extending plates and includes two slide grooves disposed on respective inner surfaces of the two extending plates, and the side wall includes two protruding points disposed corresponding to the two slide grooves respectively.

* * * * *